INVENTORS
HEINZ JOSEPH GERBER
RONALD BRUCE WEBSTER

BY McCormick, Paulding & Huber

ATTORNEYS

July 11, 1967 H. J. GERBER ETAL 3,330,182
DEVICE FOR EXPOSING DISCRETE PORTIONS OF A PHOTOSENSITIVE
SURFACE TO A VARIABLE INTENSITY LIGHT BEAM
Filed Oct. 1, 1965 6 Sheets-Sheet 3

United States Patent Office 3,330,182
Patented July 11, 1967

3,330,182
DEVICE FOR EXPOSING DISCRETE PORTIONS OF A PHOTOSENSITIVE SURFACE TO A VARIABLE INTENSITY LIGHT BEAM
Heinz Joseph Gerber, West Hartford, and Ronald B. Webster, Melrose, Conn., assignors to The Gerber Scientific Instrument Company, South Windsor, Conn.
Filed Oct. 1, 1965, Ser. No. 492,090
25 Claims. (Cl. 88—24)

ABSTRACT OF THE DISCLOSURE

A device is provided for exposing discrete portions of a light sensitive surface by means of a spot of light movable over such surface. The spot of light is generally analogous to a pencil or other writing instrument and as it is moved over the associated light sensitive surface draws lines on the surface to form the desired end display. Means are provided for varying the size of the spot to vary the width of the lines drawn and for controlling the intensity of the spot in accordance with its speed relative to the light sensitive surface. The shape of the spot may also be varied to expose similarly shaped areas of the light sensitive surface when the spot is held stationary relative to the surface. A table supports a sheet of material, such as photographic paper, having the light sensitive surface and a light projecting mechanism which produces the spot is supported for movement in a plane above the table. The table and the means for moving the light projecting device are shown to be parts of an automatic drafting machine or X-Y plotter and the projecting device is designed for ready attachment to such drafting machine or plotter in place of the normal pen carriage, print head or other graphic output mechanism.

---

This invention relates to devices for recording or reproducing data and/or for drawing lines on a light sensitive surface by means of a light beam or spot movable over such surface.

A general object of this invention is to provide a device for exposing discrete portions of a light sensitive surface by means of a spot of light which is movable over such surface to draw lines to generate different patterns, shapes or designs, to scan the surface while being varied in intensity to generate a shaded image in a fashion generally similar to that of a television receiver, or to provide the exposure of different characters, symbols or other shapes at selected parts of such surface.

Another general object of the invention is to provide a light projecting device which can be mounted on a movable carriage of a plotting machine and which is capable of operating both when the carriage is standing still to expose an associated light sensitive surface to produce dots, letters, numbers or other symbols or characters, and when said carriage is traversing said surface, to expose lines on the surface, with no tendency to over-expose or under-expose the surface in either case.

Another general object of the present invention is to provide a light projecting device for exposing discrete portions of a light sensitive material located on the table of an automatic plotting machine, which device is capable of exposing selected areas of said material to form any one of a plurality of a different shapes as, for example, circular dots, annular rings, letters of the alphabet, numerals or other symbols.

Still another object of the present invention is to provide a device for exposing discrete portions of a light sensitive material and which device is especially well suited for use in producing transparencies of the type commonly made by hand in the preparation of printed circuit boards.

A more specific object of the present invention is to provide a device for exposing discrete portions of a light sensitive material by means of a light spot or beam movable thereover and which device includes suitable means for varying the intensity of the light spot or beam in correct proportion to the speed of movement of said device with respect to the material, and for varying the intensity of said light beam in correct proportion to the width of said beam so that the degree of exposure per unit area of the light sensitive material remains relatively constant for all areas which are exposed, thereby creating accurately defined drawn lines of uniform density.

Another object of the invention is to provide a device of the general character mentioned in which the intensity of the projected beam may be accurately controlled to permit it to be used for shading when used in conjunction with a photographic film or similar photosensitive material having a relatively wide gray scale.

Other objects and advantages of the invention will be apparent from the following description and from the drawings forming a part hereof.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

Figure 1:
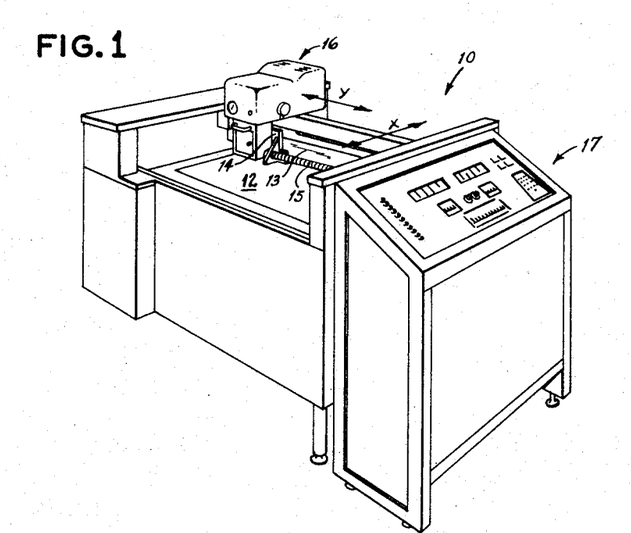
FIG. 1 is a perspective view of a light projecting device constructed in accordance with the present invention shown mounted on a suitable carriage means so as to be capable of traversing movement above the surface of an automatic plotting machine.

Turning now to the drawings in greater detail, an automatic plotting machine 10 is shown in FIG. 1 as having a plotting surface 12 and a carriage 14 for traversing said surface in two coordinate directions as indicated by the arrows X and Y. A light projecting device 16 of the present invention is mounted on the carriage 14 so that it can be driven to or from any predetermined point on the surface 12 in response to input signals supplied to the plotter by an associated input means such as, for example, a computer or the like indicated generally at 17. Preferably, the carriage is capable of moving the device 16 over the surface 12 along any line which may be straight or curved and the device 16 during such a line tracing operation is operable either continuously to produce a continuous line or intermittently to produce a series of dots or dashes or other indicia. One very important use to which a device of the present invention can be put is in the manufacture of printed circuit boards. The device 16 is adapted to expose discrete portions of light sensitive film or other photosensitive material placed on the plotting surface 12, and, through the use of a computer or other input device for controlling the movement of the carriage, the printed circuit may be drawn as a photographic negative without the need for human intervention.

For convenience, the light sensitive material which is exposed by the device 16 is generally referred to herein as light sensitive film. It will be understood, however, that the device is not necessarily limited to use with film and may be used to expose any photosensitive surface such as provided, for example, by a photosensitive emulsion or coating on a glass plate or other carrier. When making negatives for printed circuit boards or other similar negatives, the photosensitive emulsion usually selected and used is one having a high contrast with little or no gray scale. However, by using an emulsion having a significant gray scale the device 10 may be used to do shading of areas by drawing lines in varying shades of gray, this being accomplished by varying the intensity of its emitted beam.

It is characteristic of light sensitive film, particularly the high-contrast type used in making printed circuit boards, that a fairly precise amount of light energy is required to obtain an acecptable exposure. With too little light, no line or spot will be drawn on the film or at best a hazy under-exposed image will be produced, and with too much light, diffusion and scattering will take place to darken other areas of the film to produce at best a fuzzy line and at worst a completely darkened film. The degree of illumination required to properly expose the film is, therefore, quite critical and presents several problems to the design of a light source capable of movement with respect to the film. More particularly, it has been found that as the translational speed of an exposing light beam relative to the film varies, its intensity must also be varied to obtain a desirable exposure. This is due to the fact that when the beam is moving slowly it remains for a longer time on a given incremental area of the film than it would if moving fast. Therefore, to assure that substantially equal amounts of light energy are transmitted to a given incremental area of the film, the beam intensity for high beam speeds must be significantly more than the intensity used at low speed or when the light source is stationary with respect to the film.

Another problem associated with translational movement of the light beam with respect to the film arises as a result of possible desired variations in the width of the light beam used to exposed lines of various different widths on the film. The light beam as it strikes the film forms a circular spot or other simple shape and, for a constant translational speed of the beam over the film an incremental film area crossed by the circular spot or other shape will be exposed for a longer period of time when a wide beam is used than it would be if a narrower beam were used. Therefore, in order to assure uniformity of exposure when drawing lines of different widths, it has been found that provision must be made for varying the beam intensity as the width of the beam changes and in such a manner that as the beam is narrowed its intensity is increased, and vice versa.

Figures 3, 8:
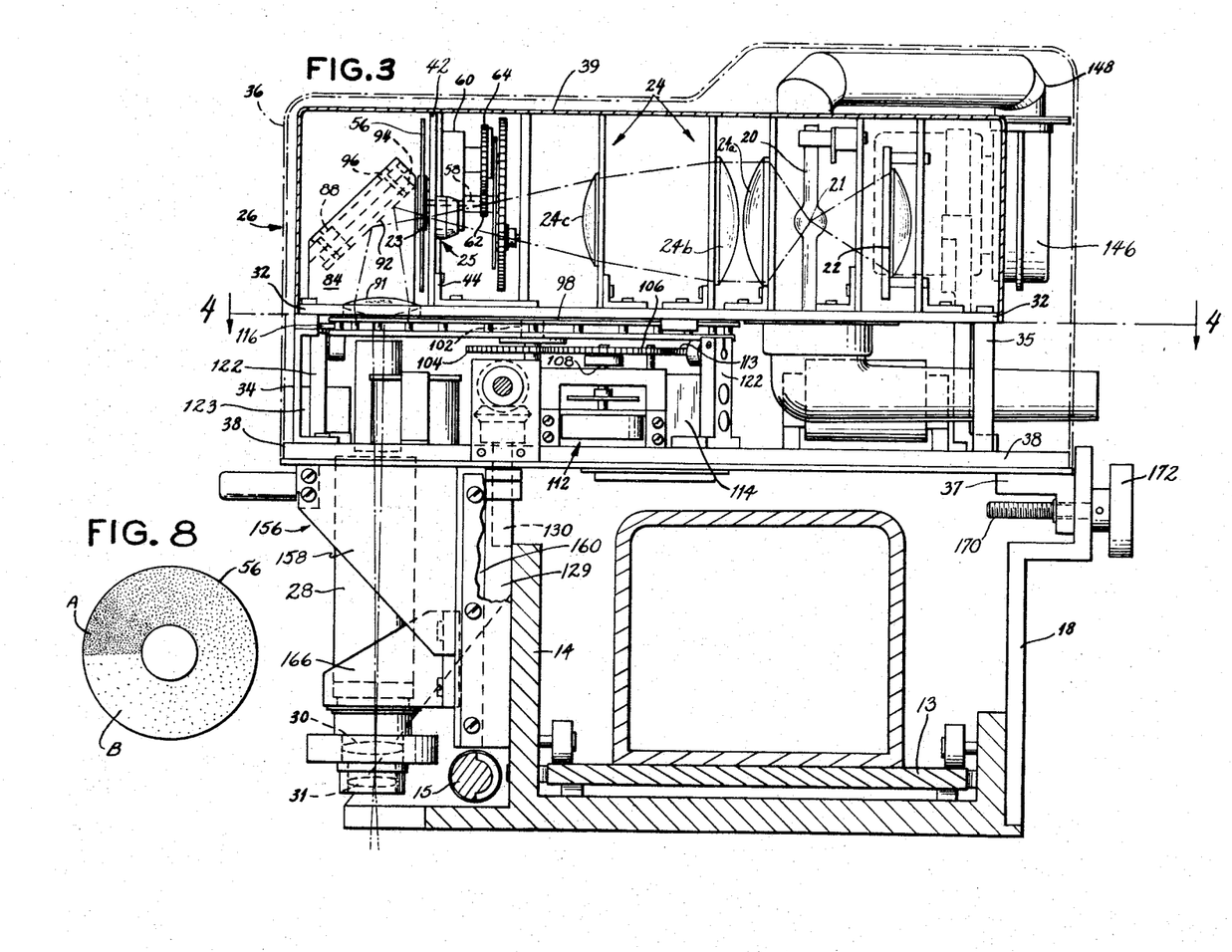
FIG. 3 is an elevational side view of the interior portion of the device shown in FIG. 1.
FIG. 8 is a plan view of the variable density filter wheel used in the light projecting device of FIG. 1.

FIG. 3 shows the light projecting device 16 as comprising a frame, consisting basically of a lower horizontal plate 38 and an upper horizontal plate 32, which is adapted for attachment to the carriage 14 of the plotting machine 10. The carriage 14 is in turn moved in the Y direction of FIG. 1 by rotation of a lead screw 15 and is guided in such movement by an associated guideway 13. The lead screw 15 and guideway 13 form part of a larger second carriage which is movable in the X direction of FIG. 1 and, accordingly, by proper movement of both of the carriages the light projecting device 16 may be moved over any line or to any point on the plotting surface 12.

As mentioned previously, it is necessary, to assure proper or uniform exposure when drawing a line, to vary the intensity of the beam emitted from the device 16 in accordance with the speed of the beam relative to the film. This variation in the intensity of the beam is accomplished in the device 16 through the use of a filter interposed between the light source and the film and having a surface over which its light transmissibility varies in one direction. Such filters are commonly referred to as variable density filters since when they are held up to a light and viewed their apparent light transmission will be noted to vary over the surface through which light passes. The particular type of filter used in the device 16 is a circular one in which the density or light transmissibility varies gradually in the direction of rotation about its center. If either the width of the light beam passed through the filter or the density gradient of the filter is large, the beam after passing through the filter will have a significant variation in intensity over its cross-sectional area due to different portions of the beam passing through significantly different density portions of the filter. In order to overcome or minimize this effect and to produce a filtered beam of substantially uniform intensity over its cross-sectional area, while nevertheless using a relatively small variable density filter having a relatively high density gradient, the device 16 includes a means for producing a substantially point source of light and the filter is located at or very close to such point source so that the light passing through the filter extends over only a very small or incremental surface area of the filter, over which incremental area the density of the filter is essentially uniform. The point source of light might possibly constitute solely a lamp or similar device from which the emitted rays emanate from a concentrated zone so as to approximate a point source. However, all known lamps which produce substantially point sources of light include glass envelopes and/or produce sufficient heat as to make it generally impossible to locate the filter close enough to the lamp to permit the use of a filter having a practical small size. In accordance with one aspect of this invention, therefore, the point source of light adjacent which the filter is placed is a real image of an actual source produced by an optical system associated with the actual source. This real image is essentially fixed in space without any surrounding obstructions and, therefore, the filter may be placed as close to it as desired.

Figure 2:
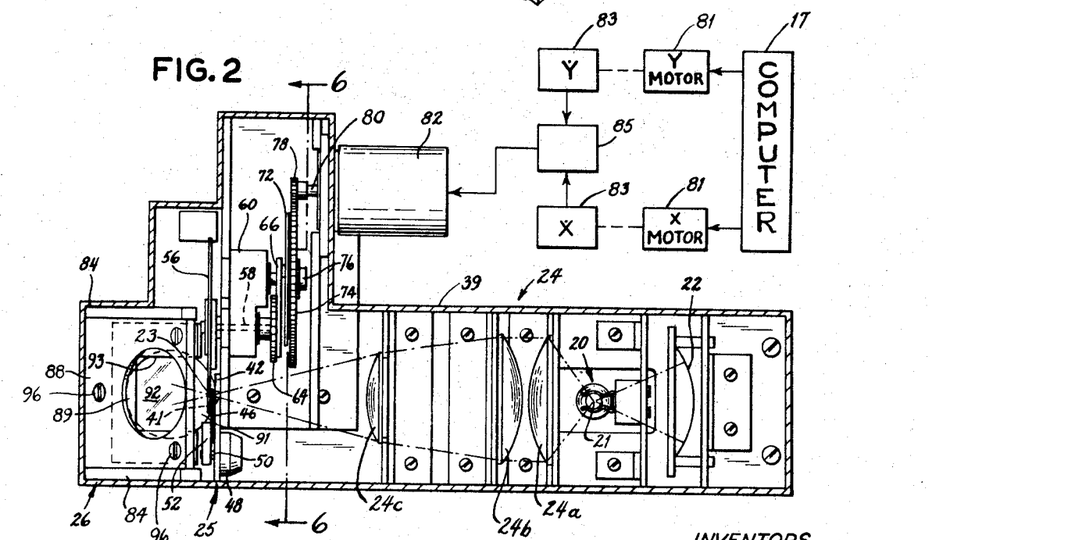
FIG. 2 is a plan view of the interior portion of the device shown in FIG. 1.

Considering in more detail the means for producing the substantially point source of light, and referring more particularly to FIGS. 2 and 3, this means as illustrated comprises an actual light source in the form of a mercury-zenon vapor lamp 20 having a glass envelope enclosing two spaced electrodes between which a concentrated arc is produced at the point indicated at 21 in FIG. 3. Light rays emanating from this point and passing through various parts of the associated optical system are indicated by the broken lines passing through the point 21. A spherically curved concave mirror 22 is located behind the lamp 20 and directs light rays falling thereon back through the point 21 to increase efficiency. Light rays passing forwardly from the lamp pass through a suitable lens system 24 which forms the rays into a real image of the point 21 at the point indicated at 23. The lens system 24 may take various forms without departing from the invention and in the illustrated case comprises two condensing lenses 24a and 24b and a converging lens 24c.

Figure 6:
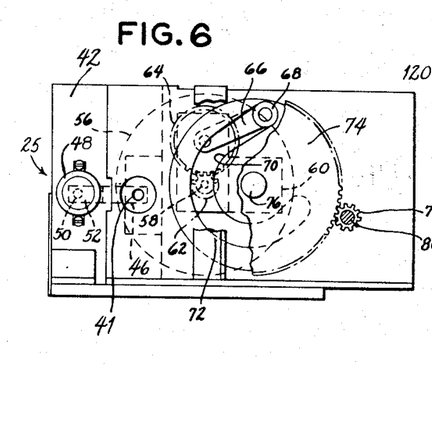
FIG. 6 is a sectional view taken along the line 6—6 of FIG. 2.

Adjacent the real image point 23 is the previously mentioned variable density filter which is in the form of a circular disc 56 and which is described in more detail hereinafter. Also at the point 23 is a shutter indicated generally at 25 and shown best in FIGS. 2 and 6. This shutter may be generally conventional in construction and basically comprises a shutter arm 46 which is movable into and out of blocking relation with respect to an aperture 41 in an aperture plate 42. Preferably the aperture 41 is of such size as to permit the passage of the image of the point 21 and to prevent or block the passage of rays emanating from the heated electrodes of the lamp 20. The aperture 41, therefore, assures that only rays from the point 21, and not from the electrodes which may be heated to incandescence, pass on to the remaining parts of the optical system. Therefore, heat rays from the heated lamp electrodes do not reach the film being exposed and changes in the film sensitivity due to changes in temperature are minimized. As shown, the filter disc 56 is also preferably located behind the aperture 41 so as to be shielded from heat rays emitted from the lamp electrodes. A rotary solenoid 48 is mounted on the aperture plate 42 and has an output shaft 50 extending forwardly through the aperture plate. The shutter arm 46 is attached to this shaft by means of a connecting part 52. Energization and deenergization of the solenoid accordingly causes movement of the shutter to open or close the aperture 41 to permit the light rays from the real image to pass onto the film or to prevent them from reaching the film.

Beyond the real image point 23, the filter wheel and the shutter 25, is a mirror assembly 26 including a mirror 92 which directs light rays from the real image 23 downwardly through a condenser lens 91 carried by the upper horizontal plate 32, through an enclosed tubular housing 28 and thence through a pair of projecting lenses 30 and 31 or other suitable projecting lens system onto the area of the film to be exposed.

The lamp 20, its reflector 22, the lenses 24a, 24b, 24c and 91, the variable density filter 56, the shutter 25, and other parts are all mounted by suitable brackets and the like to the horizontally arranged upper frame plate 32 which is supported at its forward and rearward ends respectively by two brackets 34 and 35. The lower horizontal frame plate 38 is spaced vertically below the upper plate 32 and supports the brackets 34 and 35. The lower frame plate 38 is in turn supported on the associated carriage 14 of the plate in such a manner as to permit it to be readily removed therefrom and replaced thereon. A light-proof inner housing 39 is attached to the upper frame plate 32 and in combination with the plate 32 encloses the lamp and other parts located above the upper surface of the plate 32. The lower frame 38 in turn receives an outer cover 36, shown by broken lines in FIG. 3, for completely covering and enclosing the components located above the plate 38, including the inner housing 39.

Figure 4:
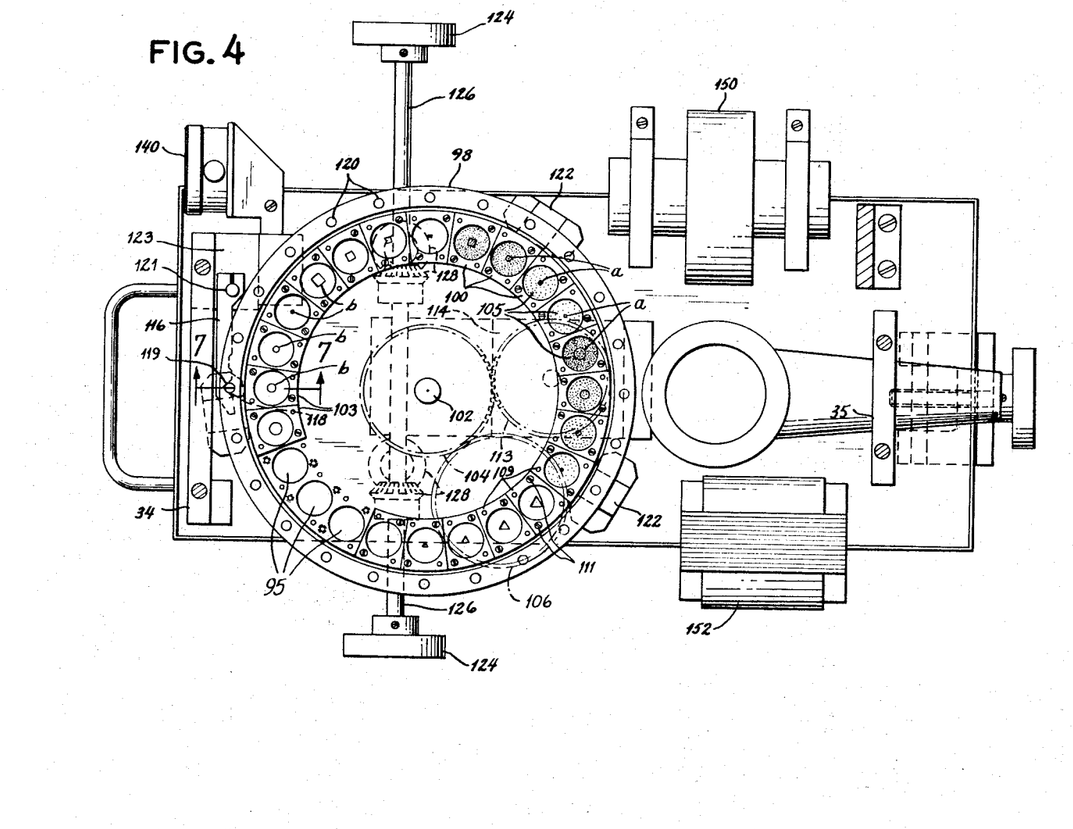
FIG. 4 is a horizontal sectional view taken along the line 4—4 of FIG. 3.
Figure 7:
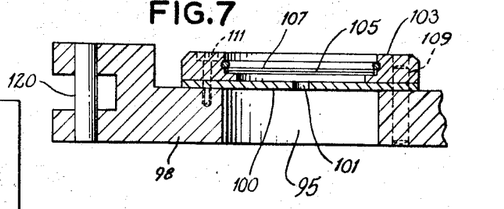
FIG. 7 is an enlarged scale cross-sectional view taken on the line 7—7 of FIG. 4 showing one filter and aperture assembly of the aperture wheel of the device shown in FIG. 1.

Included in the device 16 is a means located adjacent the condenser lens 91 on the side thereof toward the projecting lens system for varying the dimensions and/or shape of the spot or beam projected onto the film to vary the width of the line drawn by moving the beam over the film or to cause the projection of various different characters or symbols. Also included is a means, separate from the variable density filter wheel 56, for further controlling the intensity of the projected beam or spot in accordance with whether the beam is held stationary relative to the film to expose a symbol, character, dot or the like or is moved relative to the film to expose a line. This latter means may take various different forms and may be located at various different points between the film and the lamp 20. Preferably and as shown, however, this means and the means for varying the cross-sectional shape and size of the spot projected onto the film are essentially combined into one unit. As shown in FIGS. 3 and 4, such unit comprises a generally circular frame or aperture wheel 98 supported for rotation about its central axis by a shaft 102 and three roller supports 122, 122 which engage it at three angularly spaced points along the bottom surface of its marginal edge portion. These three roller supports therefore prevent the wheel from tilting or wobbling relative to its central axis and keep the wheel accurately positioned relative to the projecting lens system. The frame 98 has an annular portion, best shown in FIG. 4, providing a plurality of circumaxially spaced openings such as shown at 95, 95 in FIGS. 4 and 7. Over each of these openings is an aperture plate 100, having an aperture 101, and a filter holder 103. The filter holder 103 is adapted to receive a filter 105 which is held in place by a snap ring 107. Each aperture plate and associated filter plate is in turn mounted to the frame 98 by two locating pins 109, 109 and two screws 111, 111 as shown in FIGS. 4 and 7. In FIG. 4, most of the pins 109, 109 and screws 111, 111 have been omitted for clarity.

In FIG. 4, three of the aperture plates and their associated filter holders have been omitted to reveal the associated openings 95, 95 in the frame 98. Referring to the remaining aperture and filter assemblies, it will be noted that the apertures are of various different sizes and shapes and, therefore, by indexing the frame to bring a selected one of the apertures into the path of the light beam, the size and shape of that part of the beam which strikes the film may be controlled or varied. More particularly, the condenser lens 91 refocuses the real image 23 of the source toward the projecting lens system and, in addition to collecting the available light and adding to the overall efficiency of the system, produces a "confused" light adjacent the aperture wheel located close to the forward surface of the lens. By the term "confused" it is meant that the light rays are disorganized and do not form any image at the point in question. Instead of forming an image the light rays of confused light are relatively evenly distributed across the cross sectional area of the beam so that if the beam is captured by placing a sheet of paper across it the spot produced on the paper is evenly illuminated and lacking in definition. In the case of the condenser lens 91 the light beam passing therethrough has its rays confused in planes located close to the lens, but these rays, under the action of the lens, become more and more organized and less and less confused as they approach the point at which a real image of the light source is formed. The confused light adjacent the lens 91 therefore produces a uniform illumination of the one aperture plate which is positioned in front of the condenser lens. The projecting lens system in turn operates to focus an image of the aperture onto the film. Therefore, by varying the size and/or shape of the aperture positioned in front of the lens 91, the size and/or shape of the projected image is correspondingly varied. In the illustrated example, the projecting lens system has a fixed focal length and the use of differently sized apertures is primarily relied upon to effect changes in the size of the projected beam or spot. However, if desired, a variable focal length projecting lens system, commonly referred to as a zoom lens, could also be used in place of the illustrated lenses 30 and 31 to vary the beam or spot size.

The apertures in the aperture wheel are divided into two groups. The apertures comprising one of these groups are shown at a, a in FIG. 4 and are used when the projected beam is moved relative to the film, as when drawing lines. The filters 105, 105 associated with these apertures are of varying density with the density of each filter being related to the cross-sectional size of the associated aperture in such a manner that as the cross-sectional size of the aperture increases, the density of the associated filter also increases so that the intensity of the light beam passing beyond the aperture is varied inversely with the cross-sectional size or width of the aperture. This, therefore, overcomes the previously mentioned problem of needing a variation in the beam intensity with changes in the width of the projected beam when using the beam to draw or trace lines. This variation in intensity is not, however, required when the beam is held stationary and used to project points, dots, symbols or the like onto the film. A second group of apertures, indicated at b, b are, therefore, used to project these stationary figures or characters and these apertures have associated therewith either no filters or filters of uniform density so that the light transmissibility through all of the apertures b, b and their associated filters, if any, is substantially constant.

The circular frame 98 is attached to a short vertical shaft 102 which is rotatably supported in a bearing block and which has fixed thereto a spur gear 104 which meshes with a second spur gear 106 rotatably carried by a shaft 108, as best shown in FIG. 3. The shaft 108 is part of an encoder or commutator 112 which produces an electrical signal representative of the angular position of the spur gear 106, and in turn of the aperture frame 98. The aperture frame 98 is driven by a motor 114 drivingly connected to the frame 98 by a second spur gear 113, see FIG. 4, which also meshes with the gear 104. The motor 114 is controlled by an associated control device, such as the computer 17, which receives an input signal from a programmed tape or the like commanding a particular position of the aperture frame to bring a particular aperture to the active position. This command signal is compared with the signal produced by the encoder 112 and the motor is operated, if necessary, to bring the encoder signal into agreement with the command signal.

The aperture frame motor 114 is, however, relied upon only to produce power for driving the aperture frame through large angular displacements. To obtain precise locating or indexing of the frame, the device 16 includes an arm or pawl 118 having a V-shaped notch 119 which cooperates with a series of locating pins 120, 120 in the marginal edge portion of the frame. Each pin 120 is associated with and accurately located relative to a respective one of the apertures in the frame 98. The pawl arm 116 is in turn fixed to the shaft 121 of a pawl actuating mechanism 123 for rotation about a vertical axis to move the notch 119 into and out of engagement with one of the pins 120, 120. At the beginning of each indexing movement of the frame 98, the pawl actuating mechanism is operated to move the pawl 116 away from the associated pin 120 to free the frame for rotation. At the end of the indexing movement when the computer senses the correct encoder position, the pawl actuating mechanism drives the pawl toward the newly associated pin 120 and by the camming action which occurs between the notch 119 and 120 causes the frame to be accurately positioned.

With regard to the means for varying the shape, size, pattern, or orientation of the image projected on the receiving surface, it should be understood that the invention is not necessarily limited to the use of an aperture wheel such as the aperture wheels 98 and 98a and that various other aperture devices may be used in combination with either a fixed or a variable focal length projecting lens system to fulfill this function. For example, if it is desired to project only a generally circular beam or spot, the aperture wheel 98 of the device 16 of FIGS. 1 to 8 may be replaced by a conventional iris mechanism having a generally circular aperture and which is adjustable to vary the diameter of the aperture. Other variable aperture mechanisms involving the use of sliding plates are shown and described hereinafter in connection with FIGS. 11 and 12. Another suitable variable aperture device, somewhat similar to the aperture wheels 98 or 98a, and which may be used in place of the aperture wheel 98 or 98a consists of a sliding plate having a number of different apertures combined with a motor or solenoid for shifting the plates to bring a selected aperture into alignment with the light beam.

Reference is now made to FIGS. 2, 3 and 8 for a more detailed description of the variable density filter 56 and its actuating means. Considering first FIG. 8, the filter 56, as mentioned previously, is in the form of a circular disc having a light transmissibility which varies in the angular direction so that at one point, such as the point A, the disc is relatively opaque or dense and at another point, such as the point B, it is relatively transparent with the density varying gradually in going from point A to point B in the clockwise direction of FIG. 8. The filter is also preferably a neutral filter which does not discriminate between various different colors or frequencies of light rays. In construction, the filter may, for example, comprise a base disc of glass or other transparent material having deposited thereon a layer of translucent material which layer varies in thickness angularly of the disc. The filter is arranged generally perpendicular to the axis of the light beam and is supported on a shaft 58 which is journalled in a bearing block 60. The rear end of the shaft 58 carries a small spur gear 62, best shown in FIG. 6, which is drivingly meshed with another larger spur gear 64 rotatably supported by the block 60. The last mentioned spur gear 64 carries a cam follower arm 66 which is fixedly attached thereto and which extends generally radially outwardly therefrom. At the outer end of the arm 66 is a cam follower 68 which engages a cam slot 70 defined in a cam 72. The cam 72 is attached to a large spur gear 74 which is rotatably supported by a shaft 76 journalled in the bearing block 60 in spaced relation to the shaft 58. The spur gear 74 is drivingly connected to a small spur gear 78 on the shaft 80 of a motor 82 which may be a servomotor or stepping motor.

The motor 82 is in turn energized by a signal related to the linear speed of the device 16 relative to the plotting surface or film so that the angular position of the filter 56 relative to the light beam is varied in response to variations in the linear speed of the light beam over the film. This speed responsive signal may be derived in various different ways and, as shown in FIG. 2, may for example be produced through the use of two rate sensors 83, 83 each of which senses the speed of the output shaft of a respective one of the motors 81, 81 for the two carriages of the plotting machine. Associated with the two rate sensors 83, 83 is a means 85 which combines vectorially the outputs of the rate sensors to produce a resultant signal related to the linear speed of the device 16 and to transform such resultant signal into a signal suitable for driving the servomotor 82. The motors 81, 81 are driven by suitable signals supplied thereto by the computer 17 and representative of the desired component speeds of the device 16 in the X and Y directions. As an alternative to the use of rate sensors for controlling the filter positioning servomotor 82, the computer may include a suitable means for vectorially combining the motor drive signals and for converting the resultant signal so produced into a suitable signal for driving the servomotor 82. In either case, however, the servomotor is energized to position the filter disc 56 in accordance with the speed of the device 16 or projected light beam over the film to be exposed to accordingly vary the intensity of the projected beam with variations in the beam speed. The arrangement is further such that as the beam speed increases, the filter disc 56 is rotated to bring less dense portions thereof into the path of the light beam to increase the intensity of the projected beam. Several revolutions of the servomotor 82 are required to achieve a relatively small angular displacement of the filter disc so that the accuracy and repeatability of the filter disc position is very good. Also, by properly shaping the slot 70 on the cam 72, the beam speed versus beam intensity characteristic curve may be made to properly suit the exposure requirements of the particular light-sensitive film being used despite possible non-linearities in the filter density gradient or other parts of the system.

In controlling the position of the filter disc 56, it is assumed that when drawing a line the projected beam starts to move immediately at a given low speed rather than starting at a zero speed. The filter disc 56 is, therefore, arranged so as to return, after the completion of a line, to a normal position at which the proper amount of light will pass therethrough to properly expose a line drawn at the low beam speed at which each line is assumed to start. Therefore at the beginning of each line, the filter is positioned properly to start the line. When exposing circular spots or other stationary shapes the filter disc 56 remains at its normal position and the shutter is opened for a predetermined length of time dependent on the film speed and controlled automatically by the computer. The shutter is also, when drawing lines, opened at the beginning of the line and closed at the end of the line.

Although the filter disc 56 has been shown and described herein in some detail, it should clearly be understood that this form of variable filter has been shown by way of example only and that various other types of variable filters may be employed in place of the filter disc 56 without departing from the broader aspects of this invention. One such filter may, for example, comprise a somewhat cloudy or semi-opaque liquid contained between two glass plates which are moved toward and away from one another to vary the thickness of the liquid layer and to thereby vary the optical density of the filter. Another such filter may comprise a number of filter discs of plates arranged in line and movable into and out of the light beam singly or in groups to make available a large number of discrete density values, each filter disc or plate being of a uniform density over its full area. Many other suitable filters are well known to persons skilled in the optical art.

Referring now to the mirror assembly 26 in greater detail, two transversely spaced and vertically extending mirror supporting plates 84, 84 best shown in FIGS. 2 and 3, are attached to the upper horizontal plate 32 by several screws and support a transverse plate 88 having a generally circular aperture 89. The plate 88 has the mirror 92 fixed thereto and is inclined with respect to the axis of the light beam at approximately at 45° angle so that the mirror 92 reflects the light beam passing the filter disc 56 downwardly through the condensing lens 91 and through the hollow tubular housing 28. The mirror 92 is preferably of the type known as a "cold mirror" and is made from a treated glass which reflects light energy falling within a relatively narrow range of wave lengths and which passes light energy of wave lengths falling outside of such range. By so restricting the wave lengths in the portion of the beam which reached the film, it is possible to match the beam wave length range to some desired point on the film sensitivity curve, thereby making the exposure time less critical and obtaining more latitude in acceptable exposure time. This restriction of the range of wave lengths in the projected beam also reduces or eliminates the need for expensive color corrected lens in the projecting lens system. The mirror 92 is retained in a suitable mirrow frame 94 which is attached to the mirror plate 88 by several screws 96, 96 and which includes a U-shaped notch 93 located behind that portion of the mirror which intercepts the light beam so that non-reflected light energy passes through the notch 93 and aperture 89.

Figure 5:
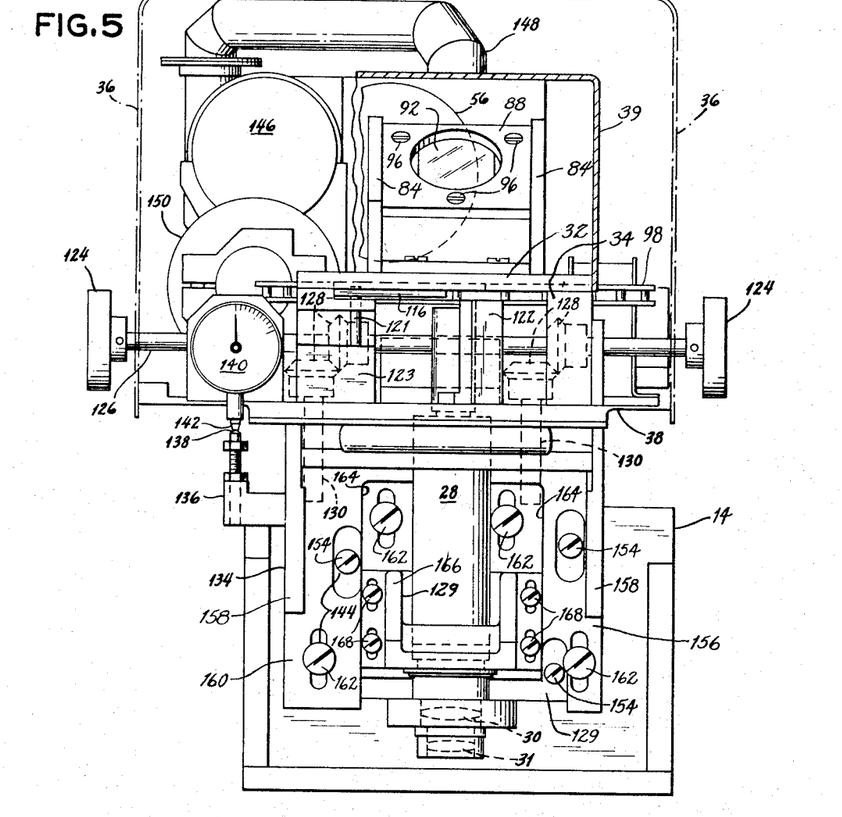
FIG. 5 is a front elevational view of the device shown in FIG. 1.

Turning now to FIGS. 3 and 5 where the device 16 is shown from the side and front, the tubular housing 28 and the associated projecting lens system can be moved vertically with respect to the plotter carriage 14 by either one of the two hand wheels 124, 124 provided at either end of a transversely extending shaft 126 which is rotatably secured to the horizontal frame plate 38. Two sets of meshing bevel gears 128, 128 are mounted respectively on the shaft 126 and on two vertically extending threaded shafts 130, 130. The threaded shafts are threadably received in a plate 129 fixed to the carriage 14 by screws 154, 154. Fixed to the forward end of the lower horizontal frame plate 38 is a downwardly extending bracket 156 including two laterally spaced side pieces 158, 158 and a rear plate 160 which overlies the plate 129. The barcket 156 slides vertically relative to the plate 129 as the knobs 124, 124 are rotated, and after the desired adjustment is made, the two plates are locked in the adjusted position by tightening a number of screws 162, 162 which pass through vertically elongated slots in the plate 160 and which are threaded into the plate 129.

Centrally between the side pieces 158, 158 the plate 160 is recessed to provide a relatively wide vertical recess having two vertical side walls 164, 164. Received in this recess and guided by the walls 164, 164 is a mounting bracket 166 which carries the projecting lens system. The mounting bracket is attached to the plate 160 by four screws 168, 168 passing through vertically elongated slots therein and threaded into the plate 160. By loosening and retightening the screws 168, 168, the mounting bracket may be shifted vertically to change the spacing between the projecting lens system and the aperture wheel to vary slightly the magnification or reduction effected by the lens system. Actually the arrangement of the projecting lens system preferably is such as to effect a reduction from the size of the aperture in the aperture wheel to the size of the image projected on the film. The tolerances on the aperture size are, therefore, less critical.

The bracket 156 includes a transversely extending arm 136, best shown in FIG. 5, having an upwardly extending screw or post fixed thereto. The screw has a smooth upper surface indicated at 138 and a dial indicator 140 or similar measuring device is secured to the lower horizontal frame plate 38 with its plunger 142 in engagement with the screw surface 138. The indicator, therefore, indicates a value which is related to the position of the projecting lenses 30, 31 above the surface of the film to be exposed and serves as an aid in focusing the light beam on the film. The dial indicator 140 is particularly useful in changing the position of the focal plane of the projected light beam to accommodate different thicknesses of light sensitive film or other material placed on the plotting surface 12. In this connection, the projecting lens system may be adjusted, for example, by loosening the screws 162, 162 and rotating the knobs 124, 124 until the projected beam is perfectly focused on the plotting surface without any film placed over the surface. The dial indicator is then set to read zero and thereafter by adjusting the knobs 124, 124 to cause the dial indicator to indicate a value equal to the thickness of the film being used on the plotting surface, the beam will be properly focused on the film. That is, if a film having a thickness of five thousandths of an inch is placed on the plotting surface, the knobs 124, 124 are turned to raise the projecting lens five thousandths of an inch as indicated by the dial indicator and accordingly, the focal plane of the beam is raised by an amount equivalent to the film thickness to assure proper focusing of the beam on the film surface. Therefore, by matching the dial indicator reading to the film thickness, proper focusing is automatically assured. After the dial indicator is set to the thickness of the film, the clamping screws 162, 162 are retightened. In addition to the clamping screws 162, 162 at the forward end of the unit, it should also be noted that another clamping screw 170, having a hand knob 172, is located at the rear of the unit. This screw is threadably received in a bracket 37 fastened to the lower frame plate 38 and passes loosely through a vertically elongated slot in a post 18 of the carriage 14. The screw 170 is normally maintained in a tightened condition to clamp the bracket 37 to the carriage post 18, but is loosened when adjusting the height of the unit.

Suitable means, as shown best in FIG. 5, are also provided for cooling the lamp 20 and, as shown, said means comprises a cooling fan 146 having a duct 148 communicating therewith and with the space above the lamp 20 to blow cool outside air downwardly onto said lamp and, in general, to cause circulation of cooling air over parts requiring cooling. Suitable baffles and the like may also be provided to direct and channel the flow of cooling air but such means form no part of the present invention and, therefore, have been omitted in the drawings for purposes of clarity. A suitable transformer 150 is provided for operation of the fan motor and a second transformer 152 is also provided for operation of the light source.

Figure 9:
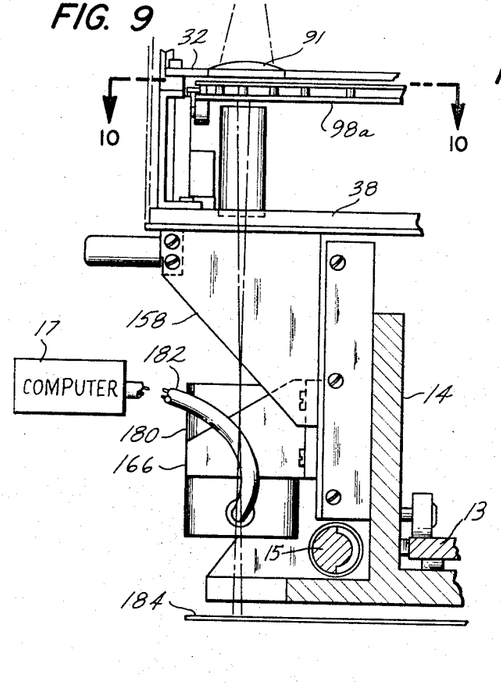
FIG. 9 is a partial elevational side view similar to a part of FIG. 3 but showing another embodiment of the invention employing a zoom lens as the projecting lens system.

As noted earlier, a device made in accordance with the present invention may, in place of a fixed focal length projecting lens system, use a variable focal length lens system, referred to as a zoom lens, as the projecting lens system. Such an arrangement is shown in FIG. 9. This figure illustrates a light projecting device which is similar to the device 16 of FIGS. 1 to 8 except for including a zoom lens 180 which is carried by the supporting bracket 166. In this figure, the parts of the device which are similar to corresponding parts of the device 16 have been given the same reference numbers as in FIGS. 1 to 8 and need not be further described. The zoom lens 180 is or may be of generally conventional construction and includes a control cable 182, connected to the computer 17 or other control device, by means of which electrical signals are transmitted to the system for controlling and varying the adjustment of the system to vary its effective focal length.

Figure 10:
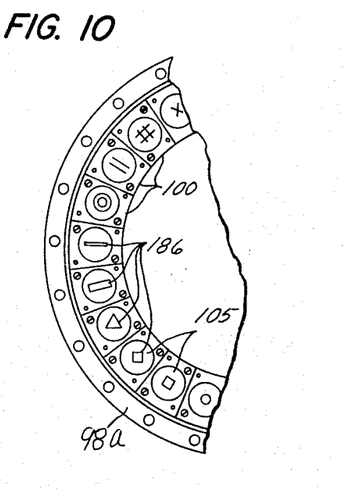
FIG. 10 is a view taken on the line 10—10 of FIG. 9 and shows a part of the aperture wheel used with the device of FIG. 9.

Associated with the zoom lens 180 is a means for forming an illuminated aperture, an image of which is projected by the zoom lens onto the associated photosensitive surface such as shown at 184 in FIG. 9. This aperture providing means may take various different forms and in some instances may comprise, if desired, a single fixed aperture located some distance above the zoom lens. In FIG. 9, however, this means is shown to constitute an aperture wheel 98a generally similar to the aperture wheel 98 of the device 16 of FIGS. 1 to 8. As shown in FIG. 10, however, the aperture wheel 98a differs slightly from the aperture wheel 98 insofar as the apertures 186, 186 of the aperture wheel 98a vary only in shape or orientation and not in size. That is, changes in the focal length of the zoom lens 180 are used to vary the size of the projected spot or beam and the aperture wheel 98a is used only to vary the shape of the projected beam. The use of the zoom lens, therefore, has the advantage of increasing the number of differently shaped apertures which may be used on the aperture wheel since a number of differently sized apertures are not required for each aperture shape. Also, the use of a zoom lens has the further advantage of reducing the need for controlling the intensity of the projected beam or spot as a function of its size. This is due to the fact that, assuming a constant intensity illumination of the shape defining aperture, the zoom lens receives the same amount of light regardless of the size of the projected beam and as the zoom lens is adjusted to vary the projected beam size, the intensity of the projected beam is automatically varied in the desired direction. That is, as the projected beam size is increased its intensity is decreased, and vice versa, as desired when using the beam to draw lines. The electrical signals applied to the zoom lens system through the cable 182 are supplied by the associated computer 17 or other controller to which the cable 182 is connected. For example, the tape or other input to the computer 17 may include instructions as to the desired beam size and the computer will function in response to such instructions to produce proper command signals which are transmitted to the zoom lens through the cable 182.

Figure 11:
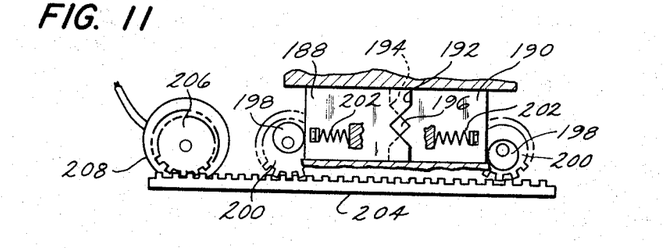
FIG. 11 is a somewhat schematic elevational view of an alternative mechanism which may be used to vary the size of the projected beam in a device of this invention.

FIG. 11 is a somewhat schematic illustration of a variable aperture mechanism, employing a sliding plate, which may be substituted for the aperture wheel 98 of the device 16 of FIGS. 1 to 8 to vary the size of the projected beam or spot. Referring to FIG. 11, the aperture mechanism there shown comprises two plates 188 and 190 which are suitably supported for longitudinal sliding movement relative to the fixed structure of the device, the plate 190 being located behind and in sliding engagement with the plate 188 as viewed in FIG. 11. The plate 188 includes a V-shaped notch 192 which partially registers with a similar V-shaped notch 194 in the plate 190 to form a square-shaped aperture 196.

Figure 12:
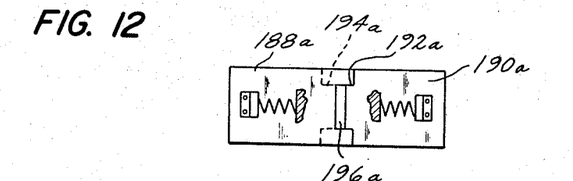
FIG. 12 is an elevational view showing an alternative pair of sliding plates which may be used in the mechanism of FIG. 11.

From FIG. 11 it will be obvious that by simultaneously moving the plates 188 and 190 toward or away from one another the size of the aperture 196 may be varied without shifting the location of the center of the aperture. Various different means may be provided for effecting this motion, and as shown in FIG. 11 such means comprises two eccentric cams 198, 198 fixed to gears 200, 200 and bearing against the respectively associated ends of the plates 188 and 190, the plates being biased away from one another and into engagement with the cams 198, 198 by springs 202, 202. The gears 200, 200 mesh with a rack 204 which is driven by a pinion 206 driven by a motor 208 which may in turn be controlled and energized by the computer 17 or other associated controller. By varying the shape of the notches 192 and 194 in the two plates, various different shapes of apertures may be provided. For example, FIG. 12 shows two plates 188a and 190a which may be substituted for the plates 188 and 190 of the mechanism of FIG. 11. The plates 188a and 190a have generally rectangularly shaped notches therein, as shown respectively at 192a and 194a, which overlap to form a rectangular aperture 196a.

Figure 13:
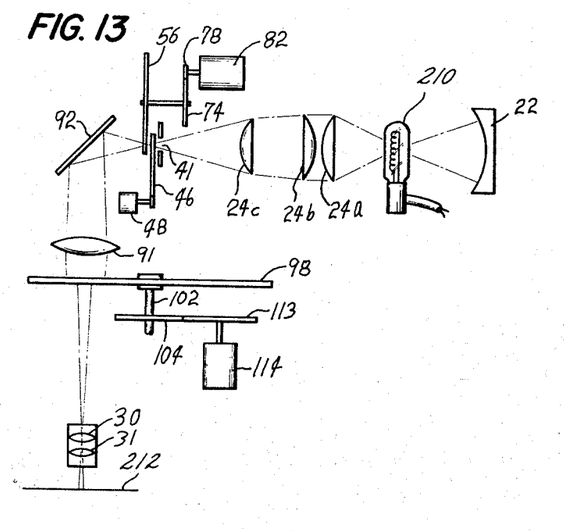
FIG. 13 is a schematic view of another embodiment of this invention employing an incandescent lamp as the light source.

As mentioned previously, one desideratum of this invention is to provide a generally uniform illumination of the aperture which controls the shape of the projected beam or spot. As also mentioned previously, this uniform illumination is preferably obtained through the use of a mercury-zenon lamp or other arc lamp used in conjunction with an optical system of the type illustrated and described in connection with FIGS. 1 to 8. The use of an arc lamp is not however essential to the broader aspects of the invention and if desired the light source may comprise an incandescent filament lamp. A device utilizing such a lamp is shown schematically in FIG. 13 and is generally similar to the device 16 of FIGS. 1 to 8 except for including an incandescent lamp 210 in place of the lamp 20 of the device 16. The remaining parts of the device shown in FIG. 13 are or may be similar to the corresponding parts of the device 16 of FIGS. 1 to 8 and have been given the same reference numbers as the corresponding parts of the device 16. The reference numeral 212 indicates the photosensitive surface onto which the beam or spot produced by the device is projected.

Figure 14:
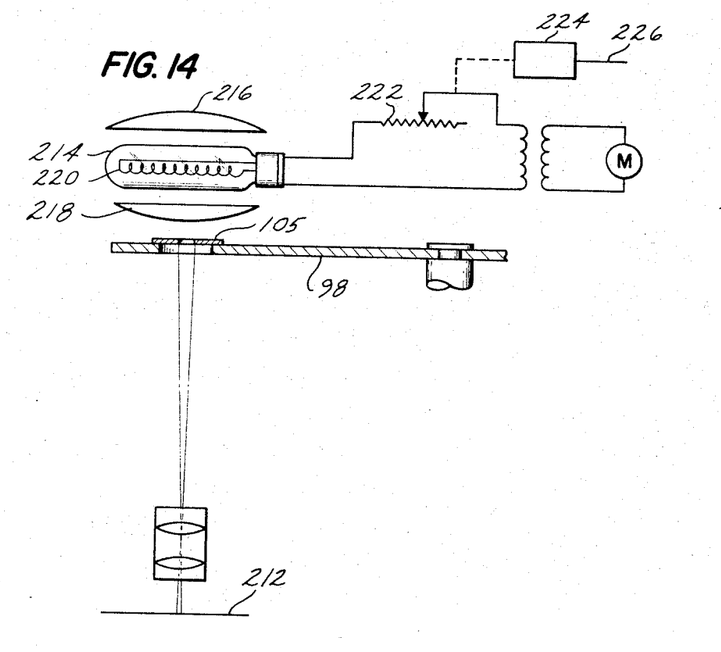
FIG. 14 is a schematic view of still another embodiment of this invention employing an incandescent lamp.

FIG. 14 shows a simplified form of means for producing a generally uniform illumination of the aperture which controls the shape of the projected beam. In this figure, the reference numeral 98 indicates an aperture wheel which is or may be identical to the aperture wheel 98 of the device 16, and the parts located below the aperture wheel 98 also are or may be similar to the parts located below the aperture wheel 98 in the device 16. Above the aperture wheel 98 is an incandescent filament lamp 214, a reflector 216 and a condenser lens 218. Light produced by the filament 220 of the lamp 214 passes through the condenser lens 218. This lens is located close to the aperture wheel 98 and produces a confused form of illumination in the vicinity of the active aperture plate 105 located by the aperture wheel 98 below the lens. The reflector 216 increases the efficiency of the lamp 220 by reflecting some of the light rays which would otherwise be lost back to the condenser lens 218. As a result of this illumination of the aperture in the aperture plate 105, a spot in the form of an image of the aperture is projected, as hereinabove described, by the associated projecting lens system onto the associated photosensitive surface 212. It will further be noted that the device of FIG. 14 includes no filter mechanism for controlling the intensity of the emitted spot in accordance with the speed of the projected beam or spot relative to the photosensitive surface. A filter mechanism could be provided for this purpose, if desired, but in the illustrated case the intensity of the projected beam or spot is varied and controlled by varying and controlling the voltage supplied to the lamp 214. This voltage may be controlled in various different ways and is shown by way of example to be controlled by a variable resistor 222 which is in turn actuated by a mechanism 224 controlled by an input appearing on an input line 226 and related to the speed of the beam relative to the photosensitive surface onto which it is projected. For example, the input signal appearing on the line 226 may be supplied by a means, similar to the means 85 of FIG. 2, which combines vectorially signals related to the speeds of the device in the X and Y directions.

As used herein and in the claims which follow the term "intensity" as applied to the projected beam or spot of light refers to the degree of illumination produced by the beam or spot over an area intercepted thereby and arranged perpendicular to the beam. As measured at the intercepted area the "intensity" of the beam or spot may be expressed in either lumens per unit area or footcandles. Therefore as the intensity of the beam or spot is increased the rate at which light energy is received by the area covered by the spot is increased, and as the intensity of the beam or spot is decreased the rate at which light energy is received by the area covered by the spot is decreased.

The invention claimed is:

1. A light projecting device for projecting a spot of light onto a light sensitive surface over which such spot is movable for the purpose of exposing a line on said surface as such spot is moved thereover, said light projecting device comprising a source of light, means for directing light rays from said source onto said surface to form a spot such as aforesaid, means in the path of said light rays providing an aperture for defining the shape of said light spot, means for varying the cross-sectional size of said light spot, and means for automatically varying the intensity of said light spot inversely with variations in its cross-sectional size.

2. A light projecting device as set forth in claim 1 further characterized by said means for varying the cross-sectional size of said light spot comprising means for varying the size of said aperture.

3. A light projecting device as set forth in claim 1 further characterized by said means for varying the cross-sectional size of said light spot comprising a variable focal length lens system located between said aperture and said light sensitive surface and arranged so as to be capable of projecting a sharp real image of said aperture onto said light sensitive surface to form said light spot.

4. A light projecting device for projecting a spot of light onto a light sensitive surface over which such spot is movable, said light projecting device comprising a lamp producing substantially a point source of light, a lens system associated with said lamp for producing a real image of said substantially point source, a filter of variable light transmissibility located near the location of said real image for varying the intensity of the light passing therebeyond, means providing an aperture located beyond said real image, a condenser lens located between said filter and said aperture and positioned relatively close to said aperture to generally uniformly illuminate the same, and a projecting lens system beyond said aperture arranged so that said aperture is the object of said projecting lens system and so that a real image of said aperture is located at the location of said light sensitive surface to expose a sharply defined spot on said light sensitive surface of a shape similar to that of said aperture.

5. A light projecting device as defined in claim 4 further characterized by a mirror located between said lamp and said projecting lens system and of the type which reflects only a narrow range of wave lengths of light rays, said mirror being arranged so that the reflected light rays pass onto said light sensitive surface and so that the non-reflected light rays are prevented from reaching said surface.

6. In an automatic plotting machine or the like having a plotting surface and a carriage adapted for traversing movement in at least two mutually perpendicular directions in a plane parallel to and spaced above said plotting surface, the improvement comprising a device mounted on said carriage for exposing discrete portions of a sheet of light sensitive material located on said plotting surface, said device including a source of light, a lens system means for forming light rays from said light source into a real image of said light source, a variable density filter having a density gradient in one direction and supported adjacent said real image so that a selected portion thereof extends across the path of the light rays at said real image, means for forming light rays passing beyond said filter into a light spot projected onto said light sensitive material, and means responsive to the speed of said device with respect to said light sensitive material for varying the position of said filter so that the amount of light passing therethrough varies directly with said speed of said device.

7. The combination as set forth in claim 6 further characterized by said means for forming light rays passing said filter into a spot including a frame having a plurality of apertures therein, means between said variable density filter and said frame for confusing said light rays at one point along the path thereof, said frame being so oriented that a section thereof extends across the path of said light rays at said one point so as to generally uniformly illuminate a selected one of the apertures in said frame, means for indexing said frame so that any selected one of the apertures therein may be illuminated by said light rays, and a projection lens system associated with said frame for projecting an image of the illuminated aperture onto said sheet of light sensitive material.

8. The combination as set forth in claim 6 further characterized by a mirror located between said source and said light sensitive material for changing the path of said light rays passing through said device, said mirror having a reflective portion made from a material which reflects radiation in one wave length range and passes at least some of the radiation falling outside of such range, said mirror being so arranged that the light rays reflected therefrom pass onto said light sensitive material and the light rays passing therethrough are prevented from reaching said light sensitive material.

9. The combination as set forth in claim 6 further characterized by said means for forming light rays passing beyond said filter into a light spot comprising means defining an aperture positioned in the path of said light rays so as to be illuminated thereby, and a projection lens system for projecting an image of said illuminated aperture onto said sheet of light sensitive material, means for adjustably moving said device relative to said carriage in the direction toward and away from said plotting surface, and an indicator means for indicating the displacement of said device from a given reference position relative to said plotting surface to allow said device to be readily adjusted for different thicknesses of light sensitive material to maintain a fixed distance between said projection lens system and the surface of the light sensitive material.

10. In an automatic plotting machine or the like having a plotting surface and a carriage adapted for traversing movement in at least two mutually perpendicular directions in a plane parallel to and spaced above said plotting surface, the improvement comprising a device mounted on said carriage for exposing discrete portions of a sheet of light sensitive material located on said plotting surface, said device including means defining an aperture, means for illuminating said aperture, and a projection lens system for projecting an image of said aperture onto said sheet of light sensitive material, means for adjustably moving said device relative to said carriage in the direction toward and away from said plotting surface, and an indicator means for indicating the displacement of said device from a given reference position relative to said plotting surface to allow said device to be readily adjusted for different thickness of light sensitive material to maintain a fixed distance between said projection lens system and the surface of the light sensitive material.

11. A light projecting device for projecting a spot of light onto a light sensitive surface over which such spot is movable, said light projecting device comprising a source of light, means for directing rays of light from said source onto said surface to form a light spot such as aforesaid, and a filter means through which said light rays pass, said filter means having a variable light transmissibility, and means for controlling said filter means in accordance with the speed of said light spot relative to said light sensitive surface to change its light transmissibility in response to variations in said speed of said light spot.

12. A light projecting device as defined in claim 11 further characterized by said filter means, including a generally circular filter disk having a light transmissibility or density which varies in the angular direction, and means rotatably supporting said disk for rotation about its central axis to permit different angular portions of said disk to be moved into the path of said light rays.

13. A light projecting device for projecting a spot of light onto a light sensitive surface over which such spot is movable, said light projecting device comprising a source of light, means for directing rays of light from said source onto said surface to form a spot such as aforesaid, said means including a lens system for forming a real image of said light source, a variable density filter member having a major surface generally normal to said light rays, said filter member being positoned adjacent said real image of said light source and having different light transmissibilities at different portions of said surface, and means for positioning said variable density filter member in accordance with the speed of said light spot relative to said light sensitive surface to bring different density portions thereof into the path of said light rays at different spot speeds.

14. A light projecting device for projecting a spot of light onto a light sensitive surface over which such spot is movable, said light projecting device comprising a source of light, means for directing rays of light from said source onto said surface to form a light spot such as aforesaid, means for controlling the intensity of said light spot in response to its linear speed with respect to said light sensitive surface, means providing a plurality of apertures selectively positionable in the path taken by said light rays and which apertures include a group of apertures having substantially the same shapes but different cross sectional sizes, and a plurality of filters each associated with a respective one of said group of apertures, said plurality of filters being of different densities and being associated with said group of apertures in such a manner that in going from any one aperture of said group to an aperture of larger size the densities of the filters associated with said apertures increase so that the intensity of the light rays passing through any one of said apertures and striking said light sensitive surface varies inversely with the cross sectional size of the light spot projected onto said surface.

15. A light projectig device as set forth in claim 14 further characterized by said plurality of apertures including a second group of apertures having various different cross-sectional shapes and/or sizes, said apertures of said second group having a substantially uniform light transmissibility so that the intensity of the light rays passing through any one of said second group of apertures and striking said light sensitive surface is substantially independent of the cross-sectional size and/or shape of the light spot projected onto said surface.

16. A light projecting device for projecting a spot of light onto a light sensitive surface over which said spot is movable, said light projecting device comprising a lamp producing substantially a point source of light, a lens system associated with said lamp for producing a real image of said substantially point source, a filter located near the location of said real image for controlling the intensity of the light passing therebeyond and having a variable light transmissibility, means for controlling the light transmissibility of said filter in accordance with the speed of said spot over said light sensitive surface to vary the intensity of said spot directly with variations in said speed, means providing an aperture located beyond said real image, a condenser lens located between said filter and said aperture for producing confused light rays at the plane of said aperture to generally uniformly illuminate the same, and a projecting lens system beyond said aperture for projecting an image of said aperture onto said light sensitive surface to provide said spot.

17. A light projecting device as defined in claim 16 further characterized by said filter comprising a plate having different optical densities at different areas thereof and said means for controlling the light transmissibility of said filter comprising means for moving said plate in response to changes in said speed of said spot.

18. A device for exposing lines on a light sensitive surface by means of a spot of light movable thereover, said device comprising means for supporting a piece of material having a light sensitive surface, a light projecting mechanism for projecting a spot of light onto the light sensitive surface of a piece of material such as aforesaid supported by said supporting means, and means for moving said light projecting mechanism relative to said supporting means in a plane generally parallel to said light sensitive surface while said spot of light is directed onto said surface to generate an exposed line thereon, said light projecting mechanism comprising means providing an aperture, means for generally uniformly illuminating said aperture, a fixed focal length projecting lens system located between said aperture and said light sensitive surface arranged so that said aperture is the object of said lens system and so that a real image of said aperture is located at the location of said light sensitive surface to expose a sharply defined spot on said light sensitive surface of a shape similar to that of said aperture, and means for varying the size of said aperture to vary the size of said spot.

19. A device as defined in claim 18 further characterized by means for varying the intensity of said light spot in accordance with the size of said spot.

20. A device for exposing lines on a light sensitive surface by means of a spot of light movable thereover, said device comprising means for supporting a piece of material having a light sensitive surface, a light projecting mechanism for projecting a spot of light onto the light sensitive surface of a piece of material such as aforesaid supported by said supporting means, and means for moving said light projecting mechanism relative to said supporting means in a plane generally parallel to said light sensitive surface while said spot of light is directed onto said surface to generate an exposed line thereon, said light projecting mechanism comprising means providing an aperture, means for generally uniformly illuminating said aperture, and a variable focal length projecting lens system located between said aperture and said light sensitive surface arranged to project a sharp real image of said aperture onto said light sensitive surface the size of which image may be varied by varying the focal length of said lens system.

21. A device as defined in claim 20 further characterized by means for varying the intensity of said light spot in accordance with the size of said spot.

22. A device for exposing lines on a light sensitive surface by means of a spot of light movable thereover, said device comprising means for supporting a piece of material having a light sensitive surface, a light projecting mechanism for projecting a spot of light onto a light sensitive surface of a piece of material such as aforesaid supported by said supporting means, and means for moving said light projecting mechanism relative to said supporting means in a plane generally parallel to said light sensitive surface while said spot of light is directed onto said surface to generate an exposed line thereon, said light projecting mechanism comprising a source of light, means for directing light rays from said source onto said surface to form a spot such as aforesaid, means for varying the cross sectional size of said light spot, and means for automatically varying the intensity of said light spot inversely with variations in its cross sectional size.

23. A light projecting device for projecting a spot of light onto a light sensitive surface over which such spot is movable for the purpose of exposing a line on said surface as such spot is moved thereover, said light projecting device comprising a source of light, means for directing rays of light from said source onto said surface to form a light spot such as aforesaid, means for controlling the intensity of said light spot in response to its linear speed with respect to said light sensitive surface, means for varying the cross-sectional size of said light spot, and means for varying the intensity of said spot inversely with its cross-sectional size.

24. A light projecting device for projecting a spot of light onto a light sensitive surface over which such spot is movable for the purpose of exposing a line on said surface as such spot is moved thereover, said light projecting device comprising a source of light, means for directing rays of light from said source onto said surface to form a light spot such as aforesaid, and means for controlling the intensity of said light spot in response to its linear speed with respect to said light sensitive surface, said means for directing rays of light from said source onto said surface to form a light spot including means providing a plurality of apertures selectively positionable in the path taken by said light rays to vary the cross-sectional character of said light spot, and lens means between said aperture providing means and said light sensitive surface arranged so that the one of said apertures positioned in the path of said light rays is the object of said lens means and said light spot is a sharp real image of the same.

25. A light projecting device as set forth in claim 24 wherein said aperture providing means comprises a generally circular frame supported for rotation about its central axis and having an annular portion providing a plurality of circumaxially spaced openings, means for indexing said frame to bring any selected one of said openings into the path taken by said light rays, and a plurality of aperture defining plates each removably secured over a respective one of said openings.

References Cited
UNITED STATES PATENTS

| | | | |
|---|---|---|---|
| 1,938,002 | 12/1933 | Amen | 240—3.1 |
| 2,415,879 | 2/1947 | Hassler | 346—108 |
| 2,464,162 | 3/1949 | Tuttle | 88—24 |
| 2,464,793 | 3/1949 | Cooke | 88—24 |
| 2,551,181 | 5/1951 | Sussin | 88—24 |
| 2,830,491 | 4/1958 | Domeshek | 88—24 |
| 3,085,469 | 4/1963 | Carlson | 88—24 |
| 3,106,880 | 10/1963 | Rossetto | 88—24 |

NORTON ANSHER, *Primary Examiner.*

W. M. FRYE, *Assistant Examiner.*